(12) United States Patent
Shimano et al.

(10) Patent No.: US 9,166,781 B2
(45) Date of Patent: Oct. 20, 2015

(54) KEY CHANGE MANAGEMENT APPARATUS AND KEY CHANGE MANAGEMENT METHOD

(71) Applicant: Kabushiki Kaisha Toshiba, Tokyo (JP)

(72) Inventors: Masato Shimano, Yokohama (JP); Go Fujino, Kiyose (JP); Masaaki Miki, Yokohama (JP); Yoshiyuki Tsuzuki, Koza-gun (JP); Isao Takeyasu, Yokohama (JP); Eiji Tokita, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 149 days.

(21) Appl. No.: 13/928,112

(22) Filed: Jun. 26, 2013

(65) Prior Publication Data
US 2014/0095878 A1    Apr. 3, 2014

(30) Foreign Application Priority Data
Sep. 28, 2012    (JP) .................. 2012-217913

(51) Int. Cl.
*H04L 9/32*    (2006.01)
*H04L 9/08*    (2006.01)

(52) U.S. Cl.
CPC ............ *H04L 9/0825* (2013.01); *H04L 9/0897* (2013.01); *H04L 2209/76* (2013.01)

(58) Field of Classification Search
CPC .. H04L 9/0825; H04L 9/0897; H04L 2209/76
See application file for complete search history.

(56) References Cited

U.S. PATENT DOCUMENTS

| | | | |
|---|---|---|---|
| 6,792,113 B1 | 9/2004 | Ansell et al. | |
| 7,603,563 B2 | 10/2009 | Ansell et al. | |
| 2005/0033974 A1 | 2/2005 | Ansell et al. | |
| 2006/0161750 A1* | 7/2006 | Perkins et al. | 711/164 |
| 2006/0236405 A1 | 10/2006 | Terauchi et al. | |
| 2008/0294908 A1 | 11/2008 | Yamaguchi et al. | |
| 2009/0063861 A1* | 3/2009 | Chu | 713/171 |
| 2014/0050318 A1* | 2/2014 | Hayashi et al. | 380/46 |
| 2014/0161251 A1 | 6/2014 | Yoshida et al. | |

FOREIGN PATENT DOCUMENTS

| | | |
|---|---|---|
| JP | 2003-518351 | 6/2003 |
| JP | 2004-312717 | 11/2004 |

(Continued)

OTHER PUBLICATIONS

Japanese Patent Application No. 2012-217913, Office Action, mailed Jan. 6, 2015, (with English Translation).

*Primary Examiner* — Nirav B Patel
*Assistant Examiner* — Mohammed Waliullah
(74) *Attorney, Agent, or Firm* — Blakely Sokoloff Taylor & Zafman LLP

(57) ABSTRACT

According to one embodiment, an apparatus includes a permission/inhibition information storage which stores a permission/inhibition information file, a changer which changes a first encryption key of a first private key encrypted with the first public key to the second public key by using the first re-encryption key, a first storage which stores a second private key in a device private key temporary storage, a second storage which stores a second re-encryption key in a re-encryption key storage, a permission/inhibition information registration module which registers second permission/inhibition information in the permission/inhibition information file, and a transmitter which transmits the second private key in the re-encryption key storage to the second terminal.

15 Claims, 23 Drawing Sheets

(56) References Cited

FOREIGN PATENT DOCUMENTS

| JP | 2005-303370 | 10/2005 |
| JP | 2006-301887 | 11/2006 |
| JP | 2012-044577 | 3/2012 |
| WO | WO 2006/011527 | 2/2006 |
| WO | WO 2012/111713 | 8/2012 |

* cited by examiner

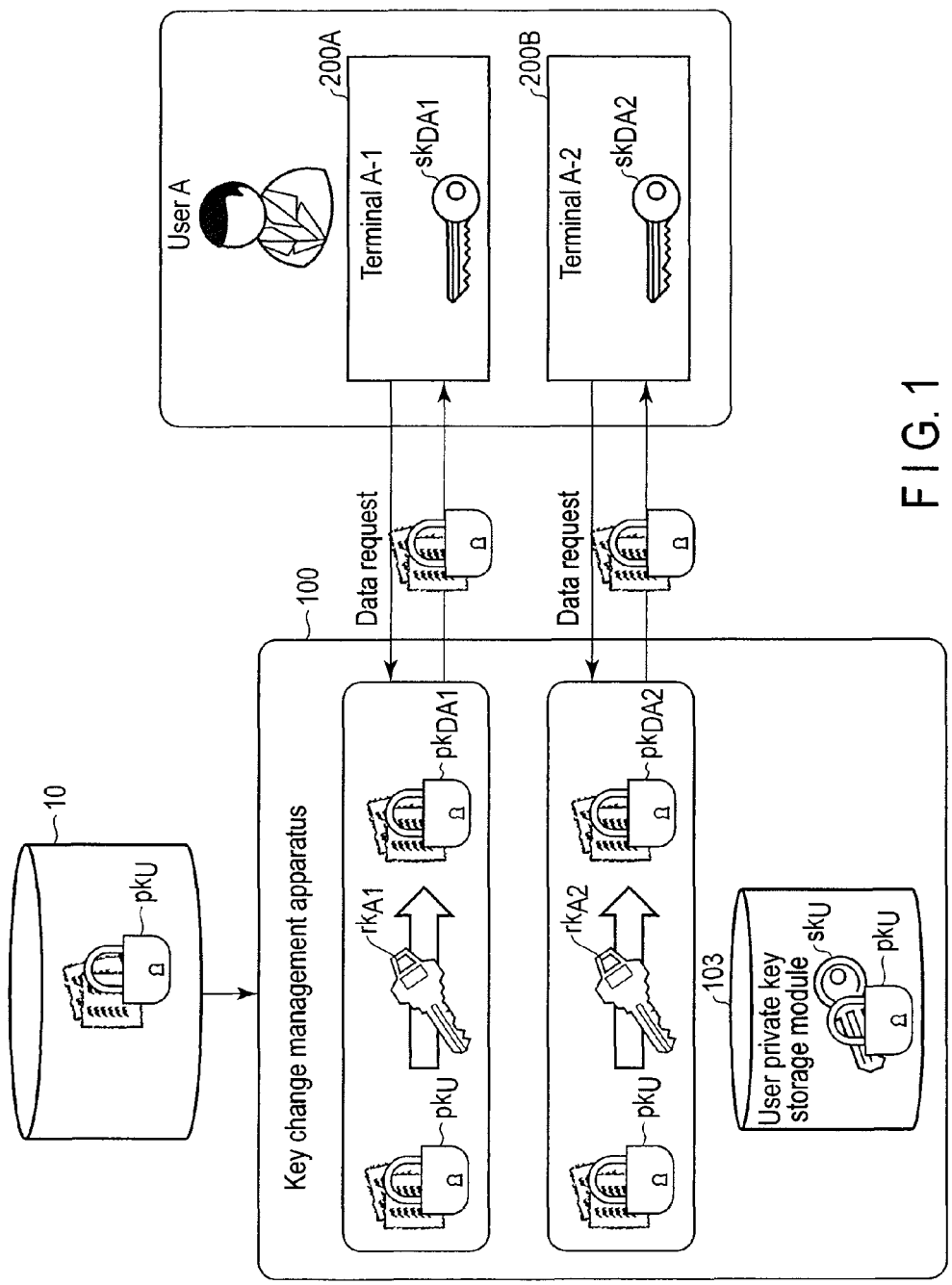
F I G. 1

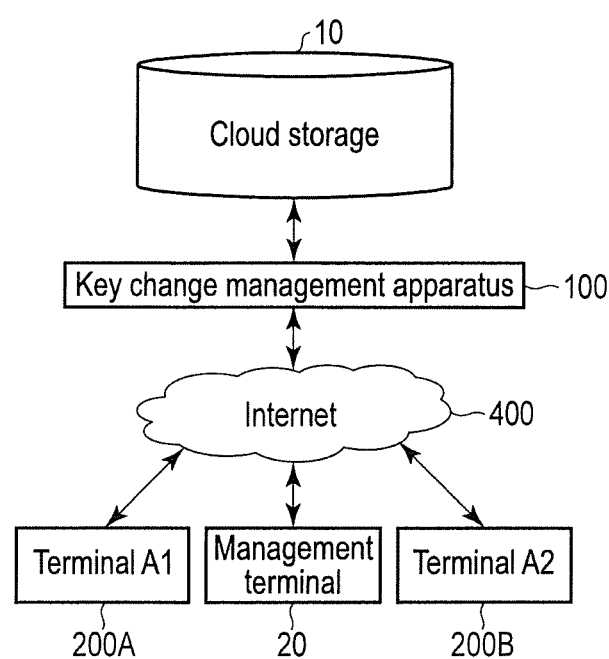
F I G. 2

| Re-encryption key ID | User ID of content owner | Terminal ID | Re-encryption key |
|---|---|---|---|
| 1 | user1 | device1-1 | 3439843aebcd3... |
| 2 | user1 | device1-2 | 5439843aebcd3... |
| 3 | user1 | device1-3 | 7439843aebcd3... |
| ⋮ | ⋮ | ⋮ | ⋮ |

FIG. 4

| Re-encryption key ID | Key change permission/inhibition |
|---|---|
| 1 | Y |
| 2 | N |
| 3 | N |
| ⋮ | ⋮ |

FIG. 5

| User private key ID | User ID of content owner | User private key |
|---|---|---|
| 1 | user1 | abc39843aebcd3... |
| 2 | user2 | def39843aebcd3... |
| 3 | user3 | fed39843aebcd3... |
| ⋮ | ⋮ | ⋮ |

FIG. 6

| User private key ID | Device ID | Device private key |
|---|---|---|
| 1 | device1-1 | abc39843aebcd3... |
| 2 | device1-2 | def39843aebcd3... |
| 3 | device1-3 | fed39843aebcd3... |
| ⋮ | ⋮ | ⋮ |

FIG. 7

| Device private key |
|---|
| ccc39843aebcd3... |

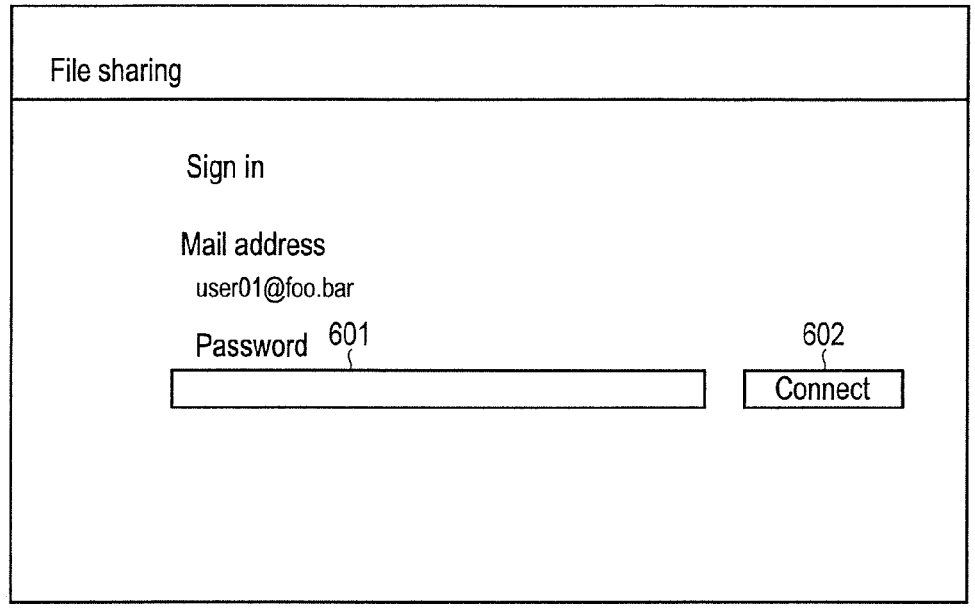
F I G. 13
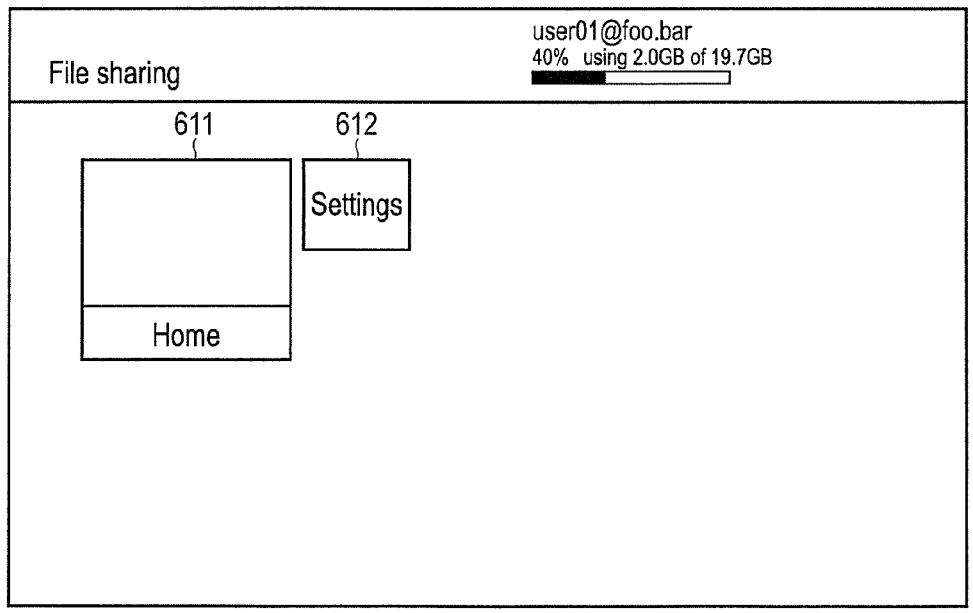
F I G. 14

File sharing: mail checking

This terminal is not permitted to be connected. Give approval from the file sharing application that is initilized on your other device.
Ready?

Yes    Return to top
 661

F I G. 19

File sharing: mail checking

What is the name of this device?

Input name of this device

671

Transmit    Return to top
 672        673

F I G. 20

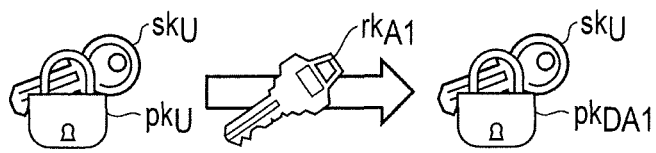
F I G. 21
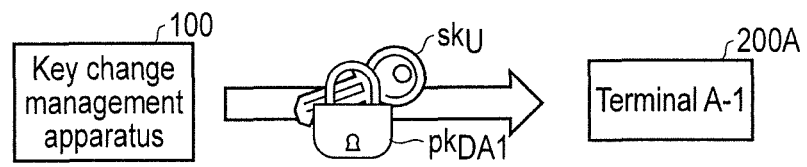
F I G. 22
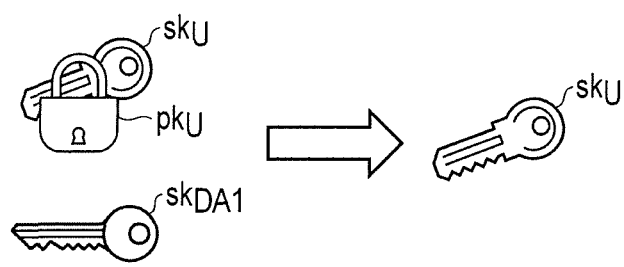
F I G. 23
F I G. 24

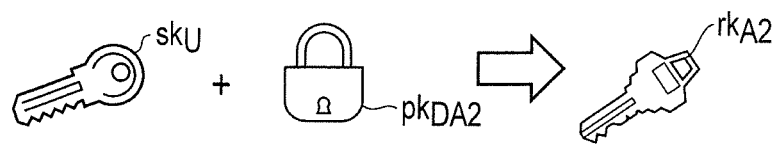
F I G. 25
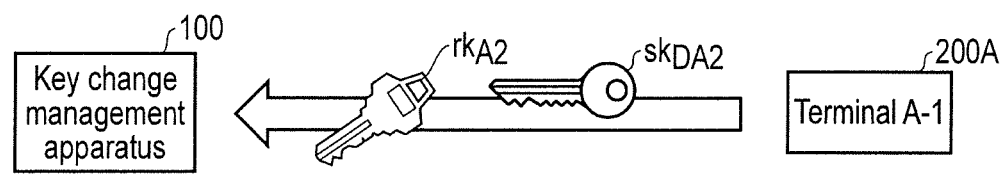
F I G. 26
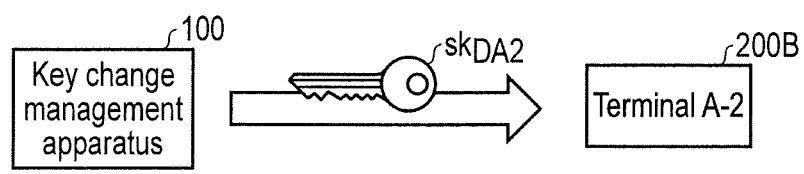
F I G. 27

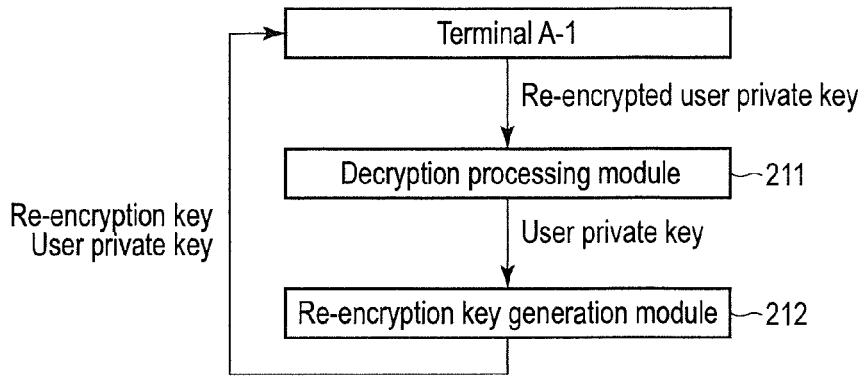
F I G. 29
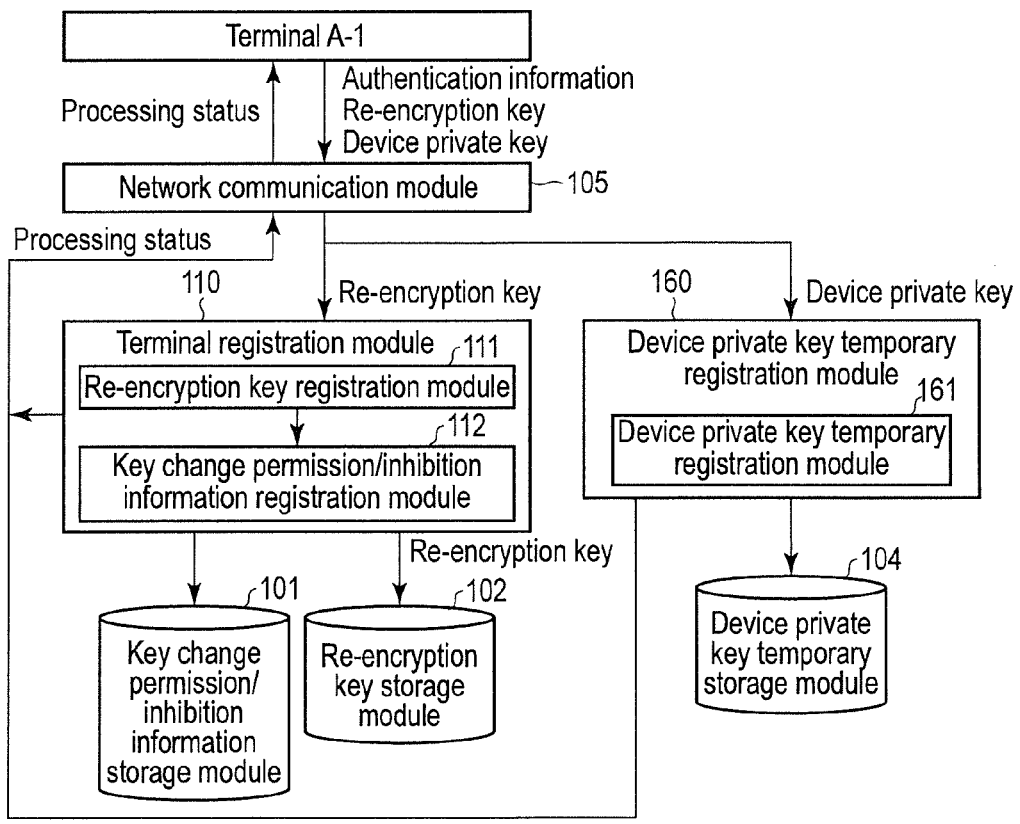
F I G. 30

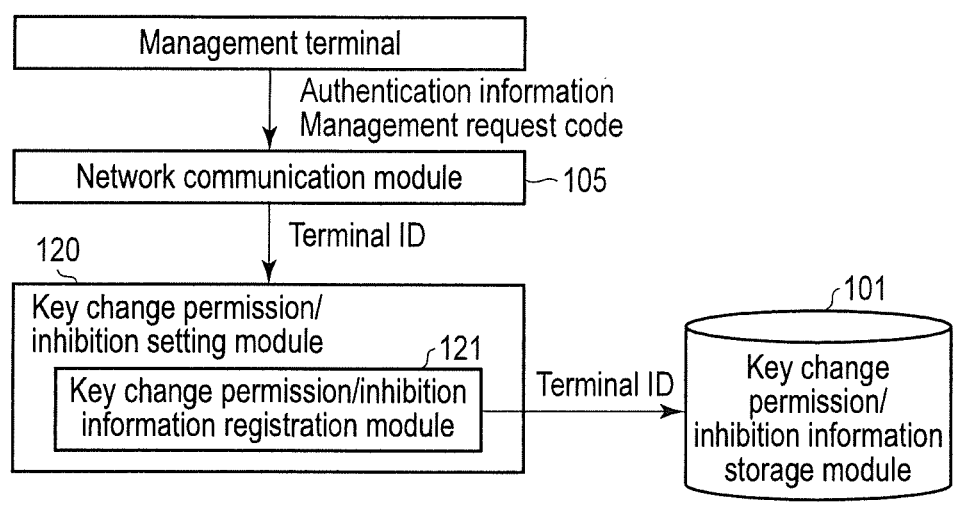
F I G. 35

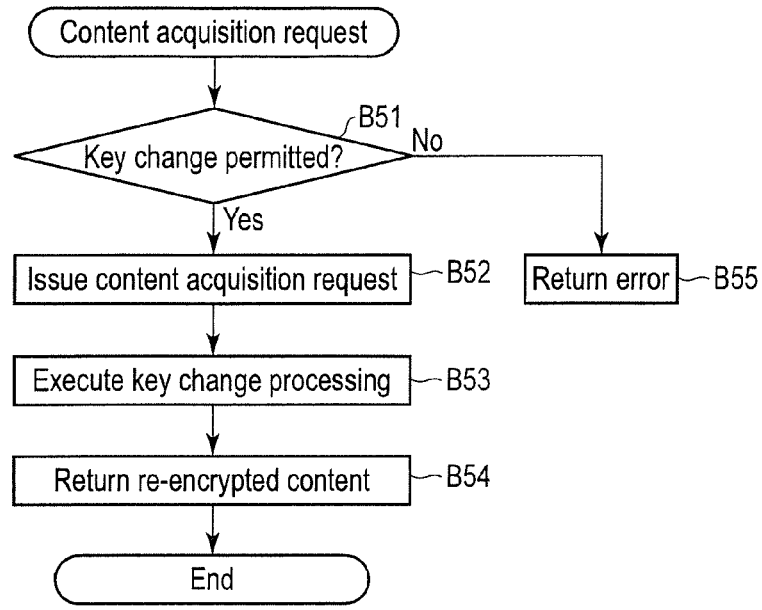
F I G. 36
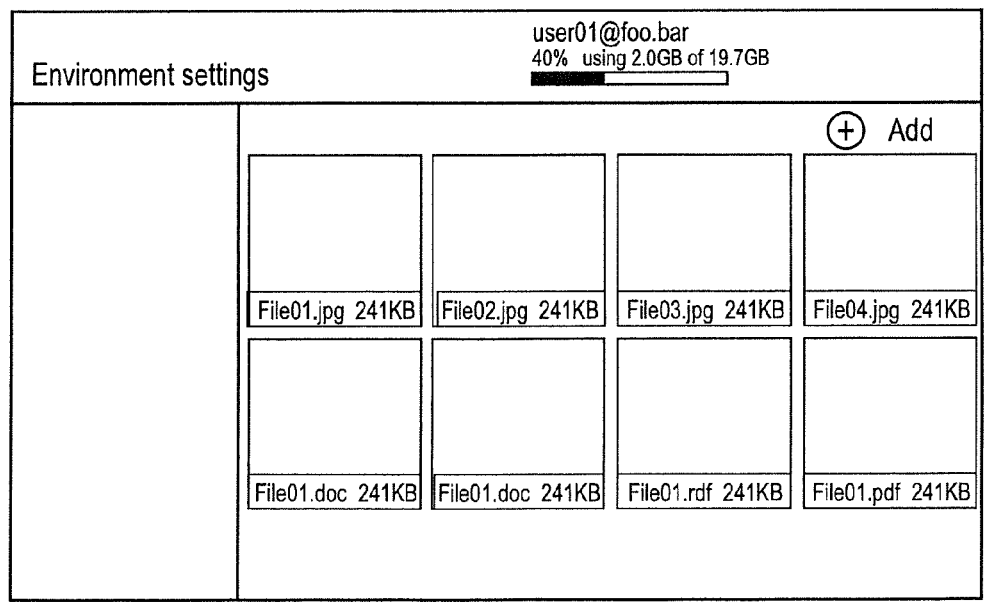
F I G. 37

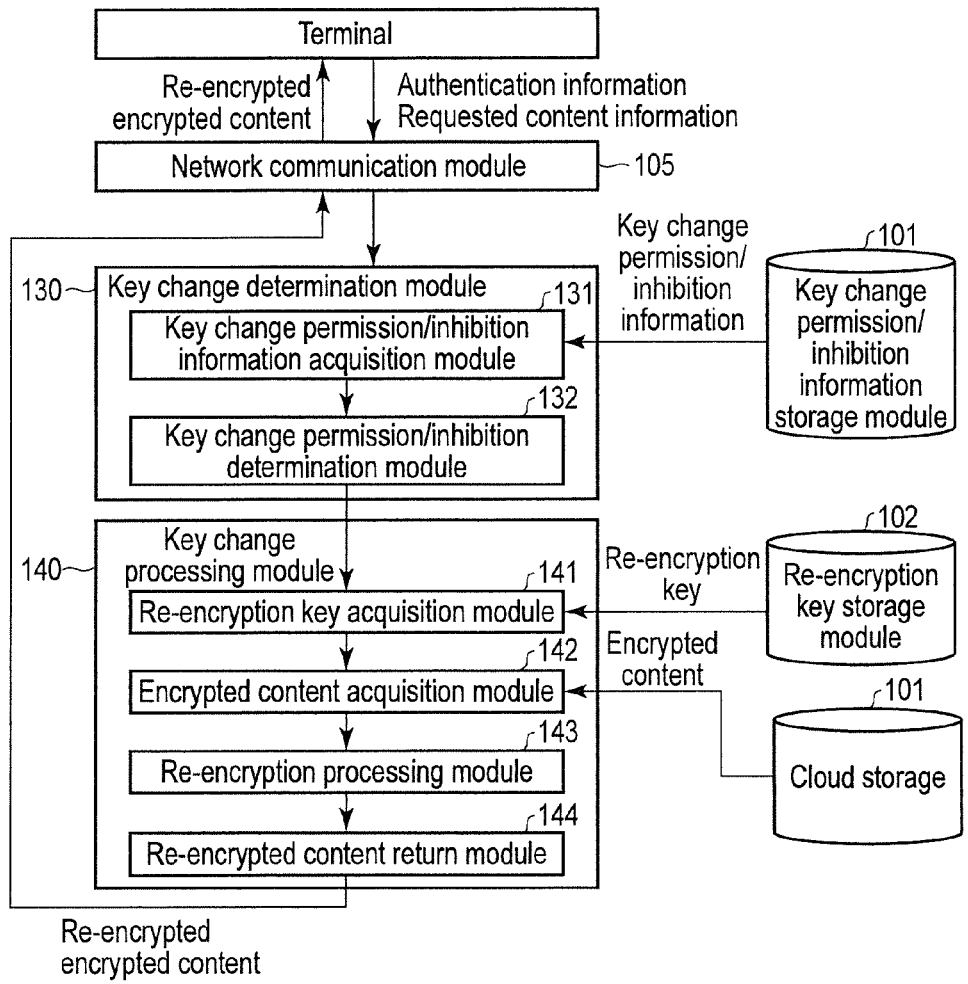
F I G. 38

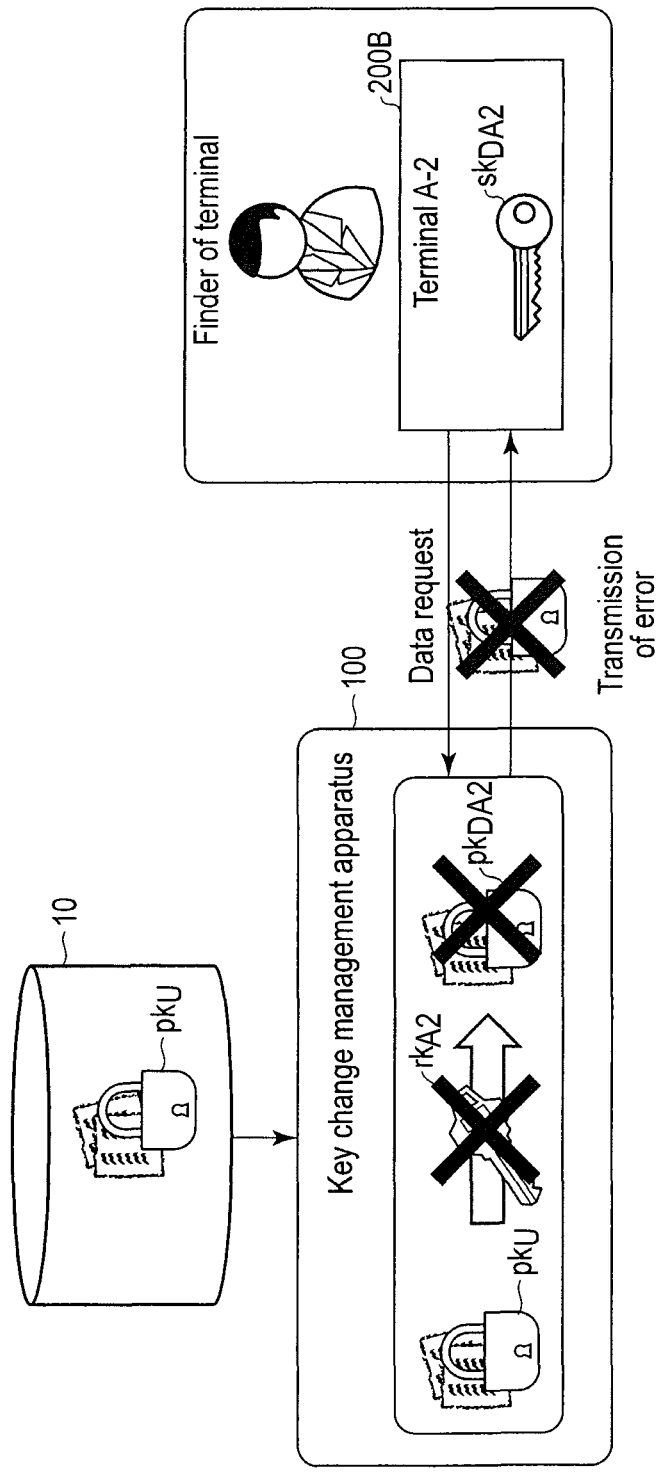
F I G. 39

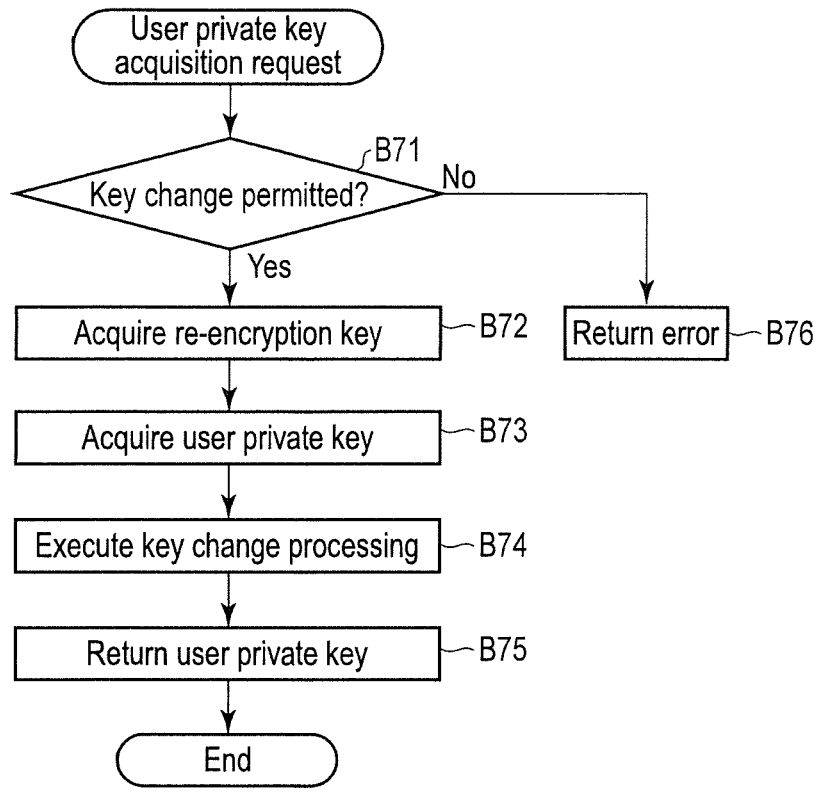
F I G. 40

KEY CHANGE MANAGEMENT APPARATUS AND KEY CHANGE MANAGEMENT METHOD

CROSS-REFERENCE TO RELATED APPLICATIONS

This application is based upon and claims the benefit of priority from Japanese Patent Application No. 2012-217913, filed Sep. 28, 2012, the entire contents of which are incorporated herein by reference.

FIELD

Embodiments described herein relate generally to a key change management apparatus and key change management method which perform encryption key change.

BACKGROUND

With the widespread use of mobile devices, there is an increasing need for the use of online storage services outside offices and homes.

In order to improve the security of content stored in an online storage, there is provided a technique of encrypting content in the online storage with a first public key and transmitting the content upon changing the encryption key from the first public key to a second public key allowing only a terminal from which a request has been received to decrypt the content.

When providing such an encryption service, it is sometimes necessary to use a special terminal to register, in a server which provides services, a new terminal which uses an online storage service. Therefore, there have been demands for a technique of registering a new terminal in a server from an arbitrary terminal which has already been registered.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view schematically showing a file sharing system according to an embodiment.

FIG. 2 is an exemplary view schematically showing the arrangement of the file sharing system according to the embodiment.

FIG. 4 is an exemplary view showing the data structure of a re-encryption key database file.

FIG. 5 is an exemplary view showing the data structure of a key change permission/inhibition database file.

FIG. 6 is an exemplary view showing the data structure of a user private key database file.

FIG. 7 is an exemplary view showing the data structure of a device private key temporary registration database file.

FIG. 13 is an exemplary view showing a window displayed on the display screen of a terminal at the time of new terminal registration processing.

FIG. 14 is an exemplary view showing a window displayed on the display screen of the terminal at the time of new terminal registration processing.

FIG. 19 is an exemplary view showing a window displayed on the display screen of the terminal at the time of new terminal registration processing.

FIG. 20 is an exemplary view showing a window displayed on the display screen of the terminal at the time of new terminal registration processing.

FIG. 21 is an exemplary view showing a schematic representation of keys at the time of new terminal registration processing.

FIG. 22 is an exemplary view showing a schematic representation of keys at the time of new terminal registration processing.

FIG. 23 is an exemplary view showing a schematic representation of keys at the time of new terminal registration processing.

FIG. 24 is an exemplary view showing a schematic representation of keys at the time of new terminal registration processing.

FIG. 25 is an exemplary view showing a schematic representation of keys at the time of new terminal registration processing.

FIG. 26 is an exemplary view showing a schematic representation of keys at the time of new terminal registration processing.

FIG. 27 is an exemplary view showing a schematic representation of keys at the time of new terminal registration processing.

FIG. 29 is an exemplary block diagram used to explain new terminal registration processing.

FIG. 30 is an exemplary block diagram used to explain new terminal registration processing.

FIG. 33 is an exemplary flowchart showing a procedure for terminal invalidation processing.

FIG. 34 is an exemplary view showing a device access management window displayed on the display screen of the management terminal at the time of terminal invalidation processing.

FIG. 35 is an exemplary block diagram used to explain terminal invalidation processing.

FIG. 36 is an exemplary flowchart showing a procedure for content acquisition processing.

FIG. 37 is an exemplary view showing a content window displayed on the display screen at the time of content acquisition.

FIG. 38 is an exemplary block diagram used to explain content acquisition processing.

FIG. 39 is an exemplary view schematically showing a case in which a terminal A-2 has issued a content acquisition request.

FIG. 40 is an exemplary flowchart showing a procedure for processing to be performed when a user private key is required.

DETAILED DESCRIPTION

Figure 3:
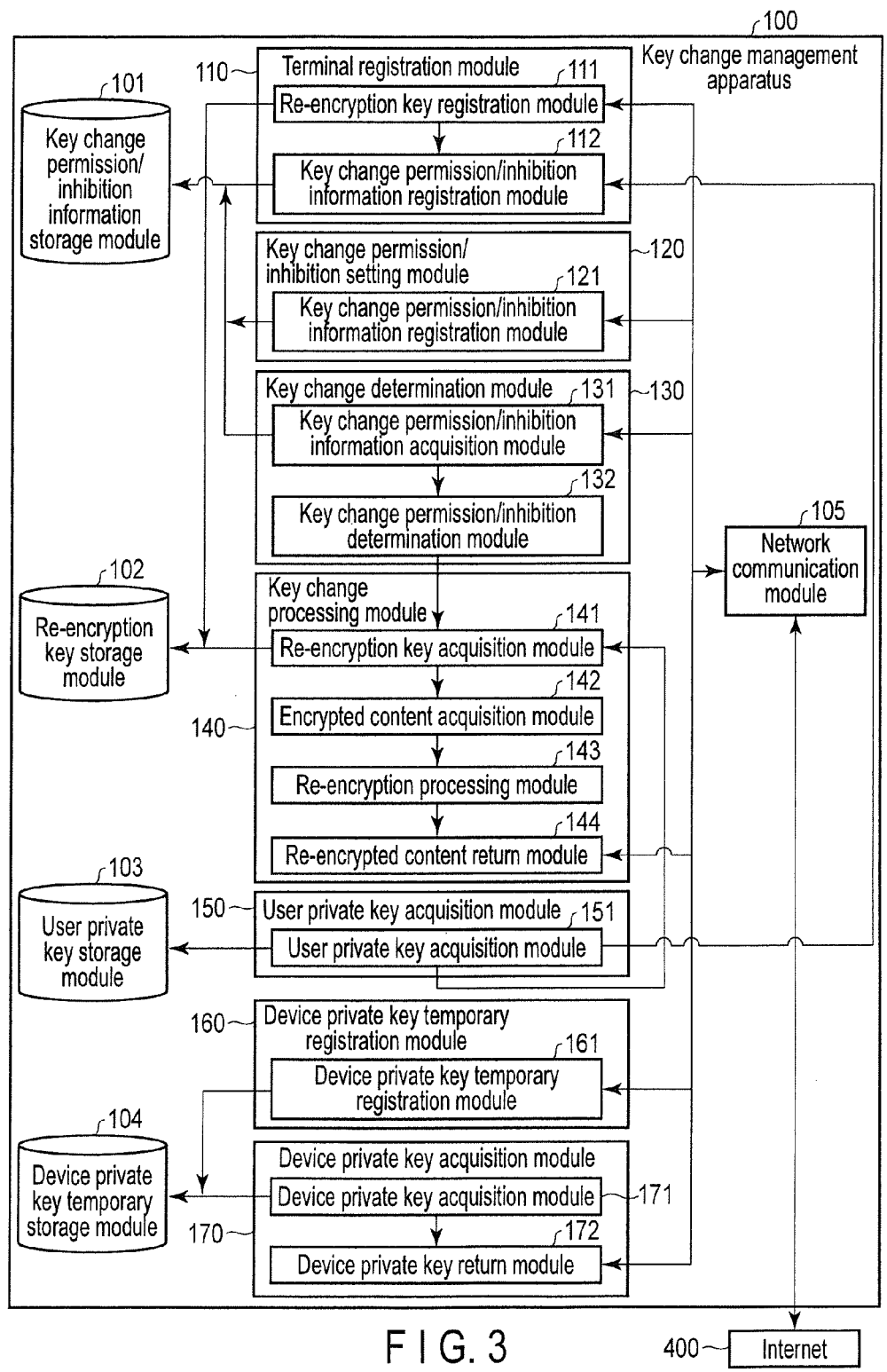
FIG. 3 is an exemplary block diagram showing the arrangement of a key change management apparatus according to the embodiment.

Various embodiments will be described hereinafter with reference to the accompanying drawings.

In general, according to one embodiment, a key change management apparatus includes a first storage, a changer, a second storage, a third storage, a storage controller, and a first transmitter. The first storage is configured to store first information indicating whether it is permitted to change an encryption key for encrypting a private key of a user from a public key of the user to a public key of a first device by using a first re-encryption key in accordance with a request from the first device, the first re-encryption key being generated by the first device based on a private key of the user and a public key of the first device. The changer is configured to change the encryption key for encrypting the private key of the user from the public key of the user to the public key of the first device by using the first re-encryption key in accordance with the request from the first device when the first information indicates that it is permitted to change the encryption key for encrypting the private key from the public key of the user to the public key of the first device. The second storage is configured to store a private key of a second device transmitted from the first device wherein the first device generates the private key of the second device and a public key of the second device. The third storage is configured to store the first re-encryption key and a second re-encryption key, wherein the second re-encryption key is generated by the first device based on the private key of the user and the public key of the second device. The storage controller is configured to store, in the first storage, second information indicating whether it is permitted to change the encryption key for encrypting the private key of the user from the public key of the user to a public key of a second device by using the second re-encryption key in accordance with a request from the second device. The first transmitter is configured to transmit the private key of the second device in the second storage to the second device in accordance with a request from the second device.

FIG. 1 is a view schematically showing a file sharing system.

The file sharing system includes a cloud storage 10, a user private key storage module 103, a key change management apparatus 100, a terminal A-1_200A, and a terminal A-2_200B.

The cloud storage 10 stores content encrypted with user public keys. When a user A clicks an icon indicating content in a window (to be described later) displayed on terminal A-1_200A, the terminal transmits a data request to request for the return of the content to the key change management apparatus 100. The key change management apparatus 100 acquires the content encrypted with a user public key from the cloud storage 10.

The key change management apparatus 100 changes the encryption key of the content from the user public key $pk_U$ to a device public key $pk_{DA1}$ of terminal A-1_200A by using a re-encryption key $rk_{A1}$. The content whose encryption key has been changed is returned to terminal A-1_200A. Terminal A-1_200A decrypts the returned content with a device private key $sk_{DA1}$ of terminal A-1_200A.

Likewise, when the user A clicks an icon indicating content in a window (to be described later) displayed on terminal A-2_200B, terminal A-2_200B transmits a data request for the content to the key change management apparatus 100. The key change management apparatus 100 changes the encryption key of the content to the device public key $pk_{DA2}$ of terminal A-2_200B. The content whose encryption key has been changed is returned to terminal A-2_200B. Terminal A-2_200B decrypts the returned content with a device private key $sk_{DA2}$ of terminal A-2_200B.

A terminal to which content is to be returned needs to be registered in the key change management apparatus 100 in advance. When registering a new terminal, a user private key is required to issue a re-encryption key. In general, a user private key is not stored in the terminal but is stored in the user private key storage module 103. A user private key $sk_U$ is stored in the user private key storage module 103 while being encrypted with a user public key $pk_U$.

Since terminals 200A and 200B each do not hold any key necessary to decrypt the user private key $sk_U$ encrypted with the user public key $pk_U$, it is not possible to acquire a key and register or a terminal unless the encryption key of the user private key $sk_U$ is re-encrypted into a device public key.

Terminal addition processing, content return processing, and terminal invalidation processing will be sequentially described below.

FIG. 2 is a view schematically showing the arrangement of a file sharing system according to the embodiment.

As shown in FIG. 2, the file sharing system includes the cloud storage 10, a management terminal 20, the key change management apparatus 100, terminal A-1_200A, and terminal A-2_200B. The cloud storage 10 and the key change management apparatus 100 are connected to each other via a network. The management terminal 20, the key change management apparatus 100, terminal A-1_200A, and terminal A-2_200B are connected to each other via Internet 400. The management terminal 20 is the first terminal registered in the key change management apparatus 100.

FIG. 3 is a block diagram showing the arrangement of the key change management apparatus 100.

The key change management apparatus 100 includes a key change permission/inhibition information storage module 101, a re-encryption key storage module 102, the user private key storage module 103, a device private key temporary storage module 104, a terminal registration module 110, a key change permission/inhibition setting module 120, a key change determination module 130, a key change processing module 140, a user private key acquisition module 150, a device private key temporary registration module 160, and a device private key acquisition module 170.

The terminal registration module 110 includes a re-encryption key registration module 111 and a key change permission/inhibition information registration module 112. The re-encryption key registration module 111 registers a re-encryption key in a re-encryption key database file in the re-encryption key storage module 102. The key change permission/inhibition information registration module 112 registers a re-encryption key ID and key change permission/inhibition information indicating whether key change is permitted in a key change permission/inhibition database file in the key change permission/inhibition information storage module 101.

FIG. 4 is a view showing the data structure of a re-encryption key database file.

As shown in FIG. 4, user IDs, device IDs, and re-encryption keys are respectively associated with re-encryption key IDs.

FIG. 5 is a view showing the data structure of a key change permission/inhibition database file.

As shown in FIG. 5, key change permission/inhibition information is associated with each re-encryption key ID. For example, "Y" is associated as key change permission/inhibition information with the re-encryption key ID "1". For example, "N" is associated as key change permission/inhibition information with the re-encryption key ID "2". For example, "N" is associated as key change permission/inhibition information with the re-encryption key ID "3". "Y" indicates that key change is permitted. "N" indicates that key change is inhibited.

The key change permission/inhibition setting module 120 includes a key change permission/inhibition information registration module 121. Upon issuance of an instruction to invalidate a terminal, the key change permission/inhibition setting module 120 transmits the received terminal invalidation instruction to the key change permission/inhibition information registration module 121. The key change permission/inhibition information registration module 121 sets a key change permission/inhibition field corresponding to terminal information to be invalidated which is stored in the key change permission/inhibition information storage module 101 to a value indicating invalidation.

The key change determination module 130 includes a key change permission/inhibition information acquisition module 131 and a key change permission/inhibition determination module 132.

Upon accepting a content acquisition request from the user, a network communication module 105 transmits the content acquisition request to the key change determination module 130. The key change permission/inhibition information acquisition module 131 acquires key change permission/inhibition information for a terminal from the key change permission/inhibition information storage module 101 and transmits the key change permission/inhibition information to the key change permission/inhibition determination module 132. The key change permission/inhibition determination module 132 determines based on the key change permission/inhibition information whether key change permission/inhibition is valid or invalid. If the determination result indicates that key change permission/inhibition is valid, the key change permission/inhibition determination module 132 transmits the information to the key change processing module 140. If the determination result indicates that key change permission/inhibition is invalid, the key change permission/inhibition determination module 132 transmits an error to the user. In this case, key change processing is not executed.

The key change processing module 140 includes a re-encryption key acquisition module 141, an encrypted content acquisition module 142, a re-encryption processing module 143, and a re-encrypted content return module 144.

The re-encryption key acquisition module 141 acquires a re-encryption key from the re-encryption key storage module 102 and transmits the re-encryption key to the encrypted content acquisition module 142. The encrypted content acquisition module 142 acquires the encrypted content requested from the user from the cloud storage 10, and transmits the acquired encrypted content to the re-encryption processing module 143. The re-encryption processing module 143 executes encryption processing for the encrypted content acquired by the encrypted content acquisition module 142 by using the re-encryption key acquired by the re-encryption key acquisition module 141. The re-encryption processing module 143 transmits the resultant content to the re-encrypted content return module 144. The re-encrypted content return module 144 returns the encrypted content to the user via the network communication module 105.

FIG. 6 is a view showing the data structure of a user private key database file stored in the user private key storage module 103.

As shown in FIG. 6, user IDs and user private keys are associated with user private key IDs.

The user private key acquisition module 150 includes a user private key acquisition module 151. The user private key acquisition module 151 acquires a user private key and stores it in the user private key storage module 103.

The device private key temporary registration module 160 includes a device private key temporary registration module 161. The device private key temporary registration module 161 acquires a device private key and registers the acquired device private key in a private key temporary registration database file in the device private key temporary storage module 104.

FIG. 7 is a view showing the data structure of a device private key temporary registration database file.

Referring to FIG. 7, device IDs and device private keys are respectively associated with device private key IDs.

The device private key acquisition module 170 includes a device private key acquisition module 171 and a device private key return module 172. The device private key acquisition module 171 acquires a device private key from the device private key temporary storage module 104 and deletes the device private key from the device private key temporary storage module 104. The device private key return module 172 returns the device private key acquired by the device private key acquisition module 171.

Figures 8, 9:
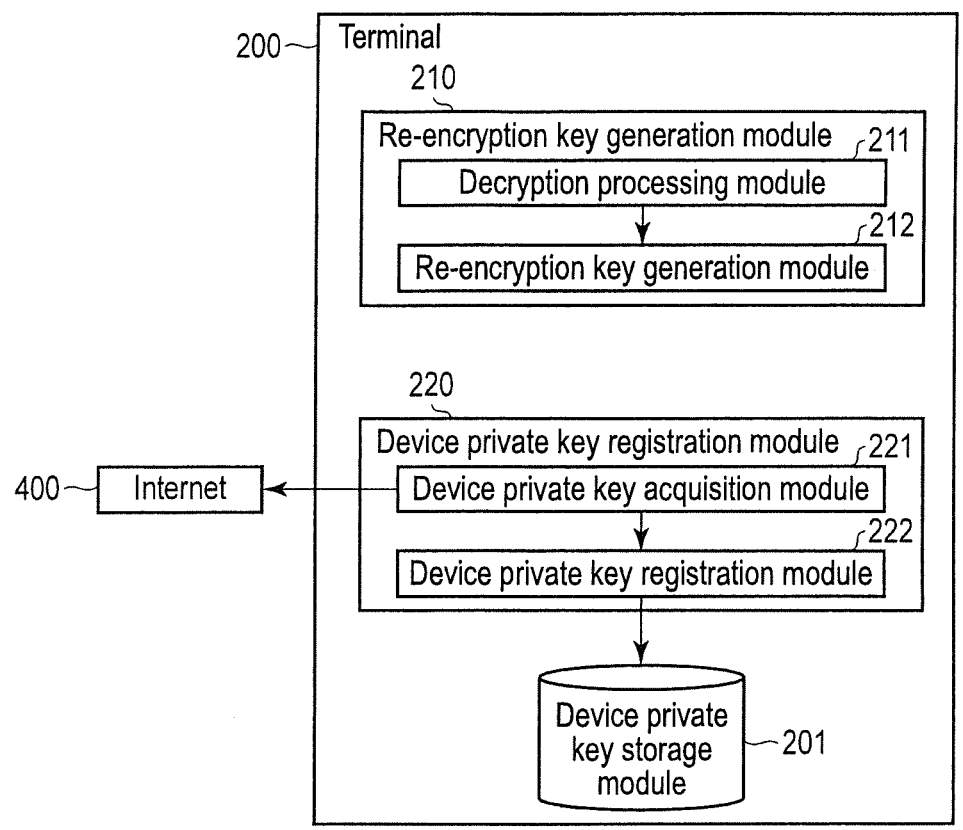
FIG. 8 is an exemplary block diagram showing the arrangement of a terminal.
FIG. 9 is an exemplary view showing the data structure of a device private key database file.

FIG. 8 is a block diagram showing the arrangement of a terminal 200.

As shown in FIG. 8, the terminal includes a re-encryption key generation module 210 and a device private key registration module 220.

The re-encryption key generation module 210 is used to register a new terminal. The re-encryption key generation module 210 generates a pair of a device private key and a device public key for a terminal to be newly registered. A decryption processing module 211 decrypts, with the device private key, the user private key acquired from the file sharing system and encrypted with the device public key. A re-encryption key generation module 212 generates a re-encryption key for a terminal to be newly added by using the user private key and the device public key for the terminal to be newly registered. The re-encryption key generation module 210 uploads the generated device private key and the re-encryption key for the terminal to be newly added to the system.

The device private key registration module 220 is used to register the self-terminal. A device private key acquisition module 221 acquires a device private key from the file sharing system. A device private key registration module 222 registers a device private key database file in a device private key storage module 201.

FIG. 9 is a view showing the data arrangement of a device private key database file. As shown in FIG. 9, a device private key is registered in the device private key database file.

A procedure for registering a new terminal in the file sharing system will be described below. The following is a case in which terminal A-1_200A has already been registered in the file sharing system, and terminal A-2_200B is newly registered in the file sharing system.

(New Terminal Addition Processing)

Figure 10:
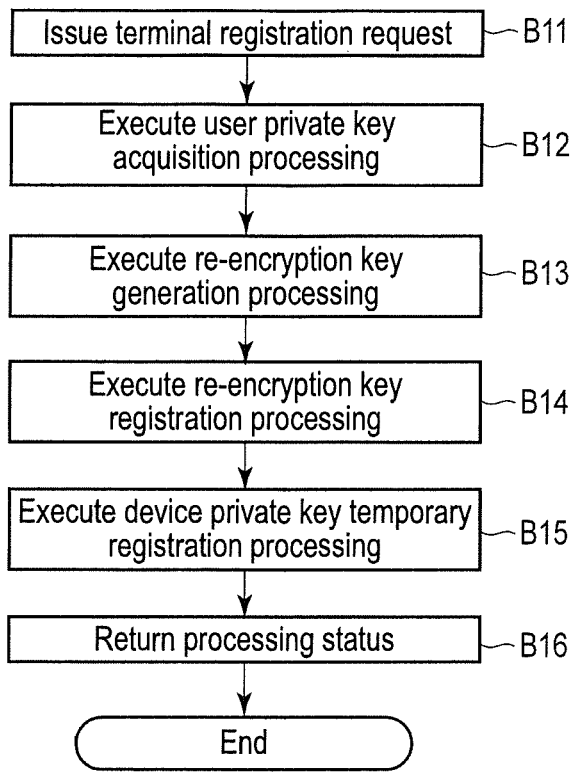
FIG. 10 is an exemplary flowchart showing a procedure performed by a terminal A-1 and the key change management apparatus at the time of terminal addition processing.

FIG. 10 is a flowchart showing a procedure performed by terminal A-1_200A and the key change management apparatus 100.

Terminal A-1_200A issues a request to register a new terminal to the key change management apparatus 100. Terminal A-1_200A executes user private key acquisition processing between itself and the key change management apparatus 100 to acquire a user private key. Terminal A-1_200A executes the re-encryption key generation processing of generating a re-encryption key $rk_{A2}$ for terminal A-2_200B. Re-encryption key registration processing is executed between terminal A-1_200A and the key change management apparatus 100 to register the re-encryption key $rk_{A2}$ for terminal A-2_200B in the key change management apparatus 100. Device private key temporary registration processing is executed between terminal A-1_200A and the key change management apparatus 100 to temporarily register the device private key $sk_{DA2}$ of terminal A-2_200B in the key change management apparatus 100. The key change management apparatus 100 notifies terminal A-1_200A of the end of the processing.

Figure 11:
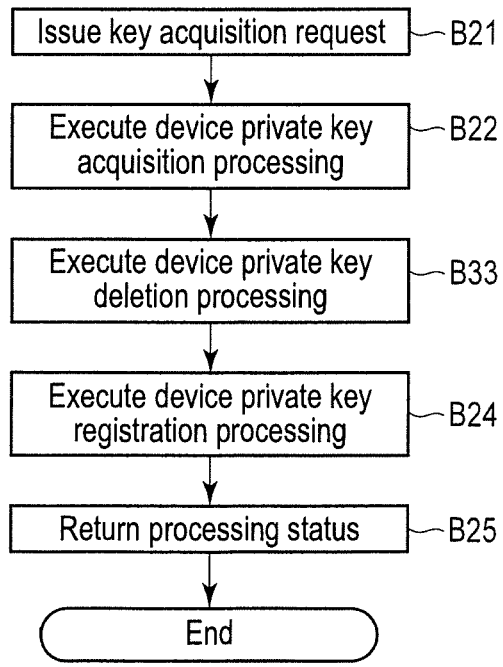
FIG. 11 is an exemplary flowchart showing a procedure performed by a terminal A-2 and the key change management apparatus at the time of terminal addition processing.

FIG. 11 is a flowchart showing a procedure performed by terminal A-2_200B and the file sharing system.

Terminal A-2_200B requests for the key change management apparatus 100 for the device private key $sk_{DA2}$ of terminal A-2_200B. Terminal A-2_200B executes device private key acquisition processing between itself and the key change management apparatus 100 to acquire the device private key $sk_{DA2}$ of terminal A-2_200B. The key change management apparatus 100 executes device private key deletion processing to delete the device private key $sk_{DA2}$ of terminal A-2_200B. Terminal A-2_200B executes device private key registration processing to register the device private key $sk_{DA2}$ in the device private key database file in the device private key storage module 201. Terminal A-2_200B notifies the end of the processing.

Figure 12:
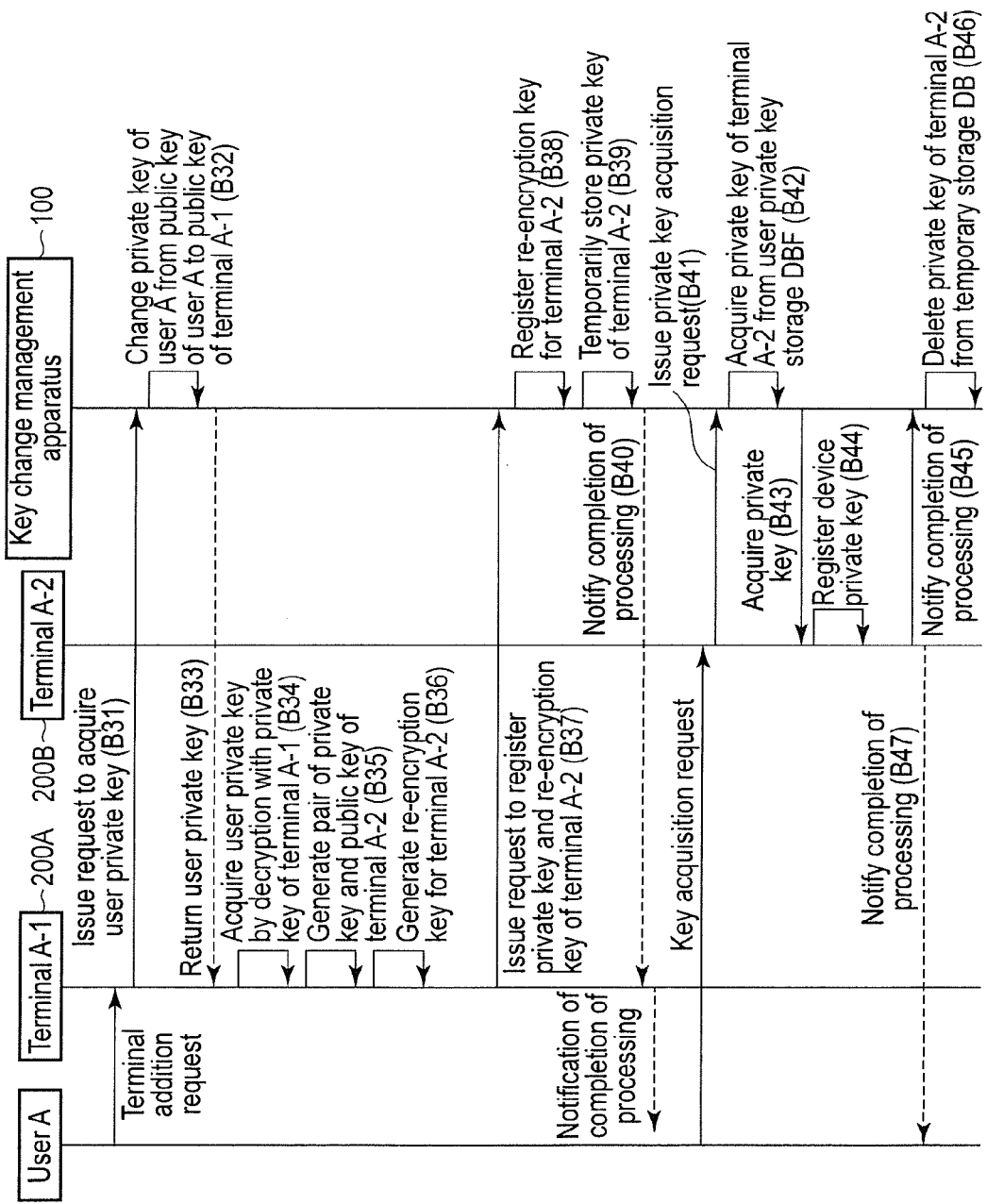
FIG. 12 is an exemplary sequence chart for explaining a procedure for registering a new terminal.

FIG. 12 is a sequence chart for explaining a procedure for registering a new terminal. FIGS. 13, 14, 15, 16, 17, 18, 19, and 20 are views each showing a window displayed on the display screen of a terminal at the time of new terminal registration processing. FIGS. 21, 22, 23, 24, 25, 26, and 27 are views each showing a schematic representation of keys at the time of new terminal registration processing. FIGS. 28, 29, 30, 31, and 32 are block diagrams each used to explain new terminal registration processing. A procedure for the processing of adding a new terminal will be described in more detail with reference to FIGS. 12, 13, 14, 15, 16, 17, 18, 19, 20, 21, 22, 23, 24, 25, 26, 27, 28, 29, 30, 31, and 32.

After inputting a password to a password input field 601 on the sign in window shown in FIG. 13 which is displayed on the display screen of terminal A-1_200A, the user operates a connection button 602 to transmit authentication information such as a mail address, password, and terminal ID from terminal A-1_200A to the key change management apparatus 100. If authentication succeeds based on the authentication information, terminal A-1_200A signs in to the key change management apparatus 100. Since terminal A-1_200A has already been registered, the mail address as one piece of the authentication information is displayed.

FIG. 14 shows the top window displayed on the display screen of terminal A-1_200A after signing in. Operating a setting button 612 in the top window will display a setting window.

Figure 15:
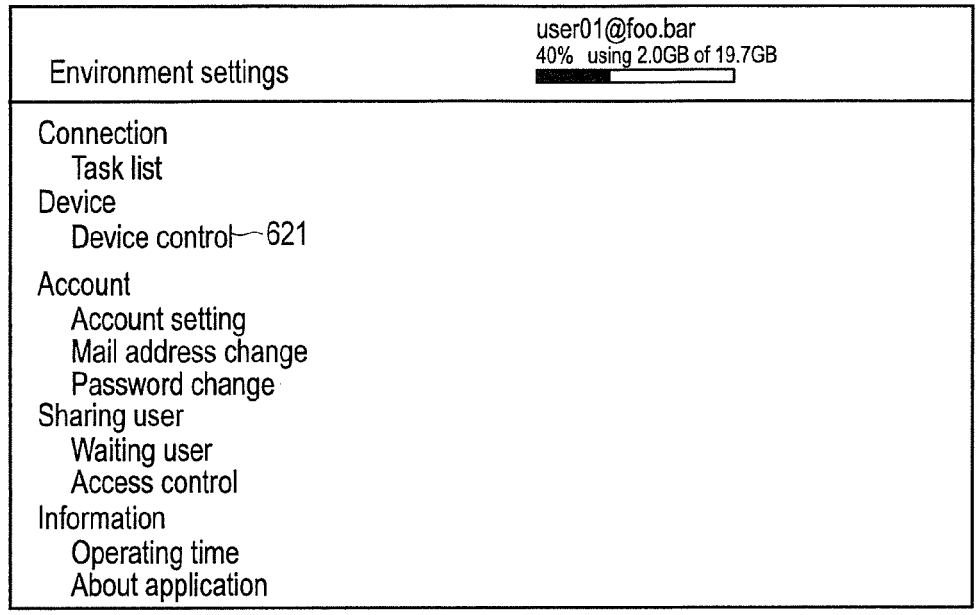
FIG. 15 is an exemplary view showing a window displayed on the display screen of the terminal at the time of new terminal registration processing.

FIG. 15 shows the setting window displayed on the display screen of terminal A-1_200A.

When the user operates a "device control" item 621 in the setting window, a device control window is displayed.

Figure 16:
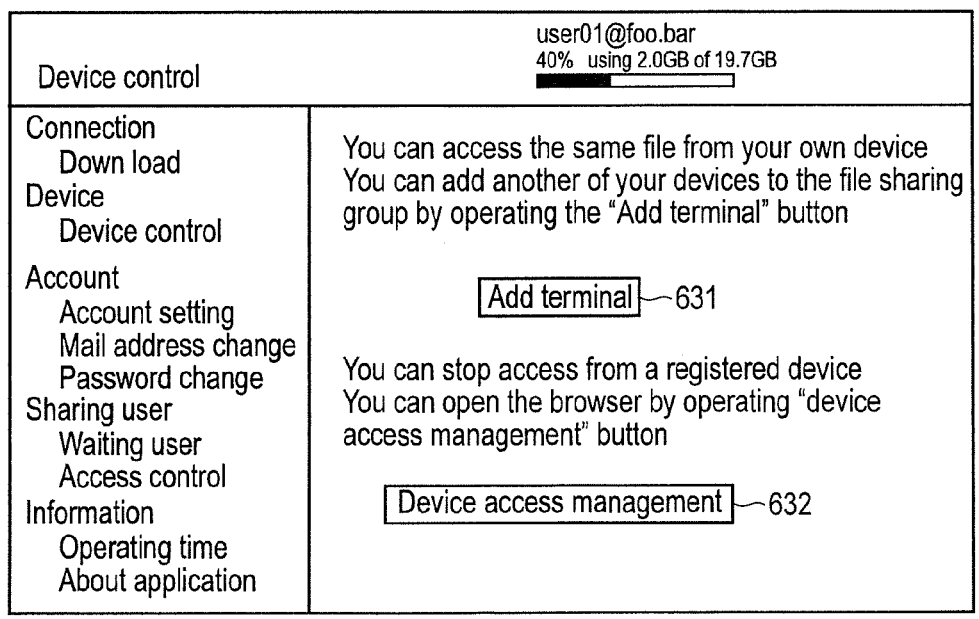
FIG. 16 is an exemplary view showing a window displayed on the display screen of the terminal at the time of new terminal registration processing.

FIG. 16 shows the device control window displayed on the display screen of terminal A-1_200A.

When the user operates an "add terminal" button 631 in the device control window, a device addition window is displayed. First of all, when the user A operates the "add terminal" button by using terminal A-1_200A, terminal A-1_200A issues a request to return a user private key to the file sharing system.

Figure 17:
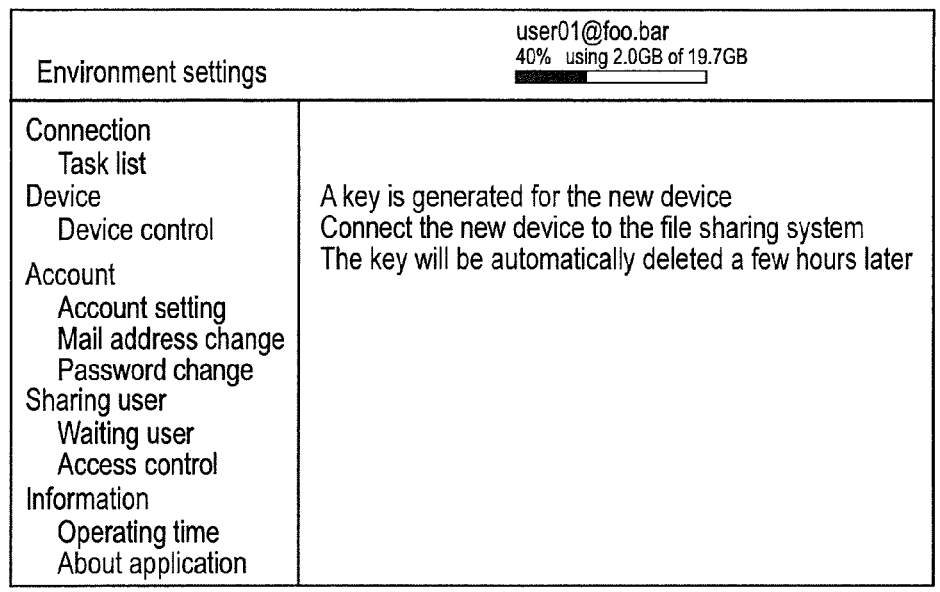
FIG. 17 is an exemplary view showing a window displayed on the display screen of the terminal at the time of new terminal registration processing.

FIG. 17 is a view showing the device addition window displayed on the display screen of terminal A-1_200A. The device addition window displays the message "A key is generated for a new device. Connect the new device to the file sharing system. The key will be automatically deleted a few hours later."

Figure 18:
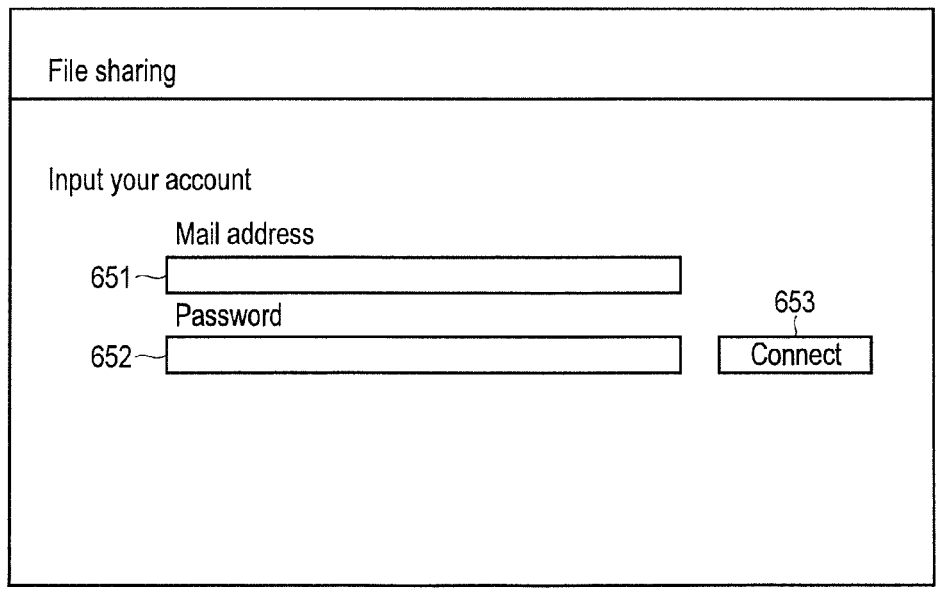
FIG. 18 is an exemplary view showing a window displayed on the display screen of the terminal at the time of new terminal registration processing.

When the user connects terminal A-2_200B to the Internet 400 and activates the file sharing application, terminal A-2_200B displays the account input window shown in FIG. 18 on the display screen. As shown FIG. 18, the account input window is provided with a mail address input field 651, a password input field 652, and a connection button 653. When the user operates the connection button 653 after inputting information to the mail address input field 651 and the password input field 652, terminal A-2_200B transmits the authentication information including the mail address, password, and terminal ID to the key change management apparatus 100.

Figure 28:
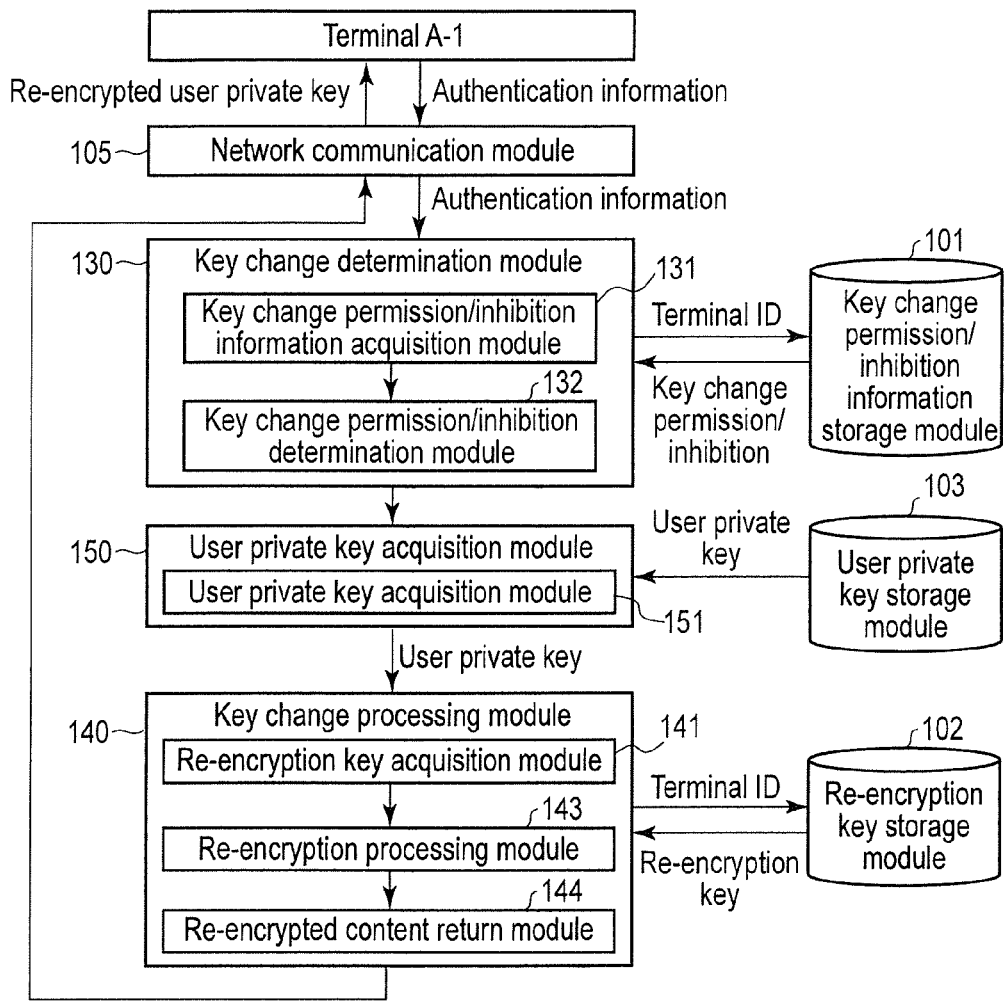
FIG. 28 is an exemplary block diagram used to explain new terminal registration processing.

The processing in steps B32 and B33 will be described with reference to the block diagram of FIG. 28.

The network communication module 105 receives the authentication information transmitted from terminal A-1_200A. The network communication module 105 transmits the authentication information to the key change determination module 130. The key change permission/inhibition information acquisition module 131 acquires key change permission/inhibition corresponding to the terminal ID of terminal A-1_200A from the key change permission/inhibition information storage module 101. The key change permission/inhibition determination module 132 determines, based on the key change permission/inhibition, whether encryption key change is permitted. Upon determining that encryption key change is permitted, the key change permission/inhibition determination module 132 notifies the user private key acquisition module 150 of the corresponding information. The user private key acquisition module 151 acquires a user private key corresponding to a user of terminal A-1_200A from the user private key storage module 103. The user private key acquisition module 151 transmits the user private key to the key change processing module 140. The re-encryption key acquisition module 141 acquires a re-encryption key corresponding to terminal A-1_200A from the re-encryption key storage module 102. As shown in FIG. 21, the re-encryption processing module 143 changes the encryption key of the user private key $sk_U$ from the user public key $pk_U$ to a device public key $pK_{DA1}$ of terminal A-1_200A by using a re-encryption key $rk_{DA1}$. As shown in FIG. 22, the re-encrypted content return module 144 in the key change management apparatus 100 returns the user private key $sk_U$ re-encrypted by changed to the device public key $pK_{DA1}$ to terminal A-1_200A by using the network communication module 105.

The processing in steps B34 to B36 will be described with reference to the flowchart of FIG. 29.

The decryption processing module 211 decrypts the user private key $sk_U$ re-encrypted by the device public key $pK_{DA1}$ by using a device private key $sK_{DA1}$ of terminal A-1_200A, as shown in FIG. 23. The re-encryption key generation module 212 generates a device private key $sk_{DA2}$ and a device public key $pk_{DA2}$ for terminal A-2_200B, as shown in FIG. 24. As shown in FIG. 25, the re-encryption key generation module 212 generates a re-encryption key $rk_{A2}$ for terminal A-2_200B by using the user private key $sk_U$ and the device public key $pk_{DA2}$.

The processing in steps B37 to B40 will be described with reference to the block diagram of FIG. 30. As shown in FIG. 26, terminal A-1_200A transmits authentication information and the device private key $sk_{DA2}$ and the re-encryption key $rk_{A2}$ for terminal A-2_200B to the key change management apparatus 100, and issues a request to register the device private key $sk_{DA2}$ and the re-encryption key $rk_{A2}$. The network communication module 105 transmits the re-encryption key $rk_{A2}$ to the terminal registration module 110, and transmits the device private key $sk_{DA2}$ to the device private key temporary registration module 160. The re-encryption key registration module 111 registers the re-encryption key $rk_{A2}$ in a re-encryption key database file in the re-encryption key storage module 102. The key change permission/inhibition information registration module 112 registers information indicating that terminal A-2_200B can perform key change in a key change permission/inhibition database file in the key change permission/inhibition information storage module 101.

The device private key temporary registration module 161 registers the device private key $sk_{DA2}$ of terminal A-2_200B in a device private key temporary storage database file in the device private key temporary storage module 104. The key change management apparatus 100 notifies terminal A-1_200A of the completion of the processing. Terminal A-1_200A displays a message indicating the completion of the processing on the display screen.

Subsequently, processing is performed between terminal A-2_200B and the key change management apparatus 100.

Terminal A-2_200B transmits the authentication information including the mail address, password, and terminal ID input to the account input window shown in FIG. 18 to the key change management apparatus 100. If authentication succeeds based on the mail address and the password, terminal A-2_200B displays the initialization window shown in FIG. 19 on the display screen because the terminal ID is not registered in a key change permission/inhibition file in the key change permission/inhibition information storage module 101. This initialization window displays the messages "This terminal is not permitted to be connected." and "Give approval from the file sharing application initialized on another of your devices." When the user operates a YES button 661, terminal A-2_200B displays the device name input window shown in FIG. 20 on the display screen, if a device private key corresponding to terminal A-2_200B is registered in a device private key temporary storage database file in the device private key temporary storage module 104 and a re-encryption key database file in the re-encryption key storage module 102.

Figure 31:
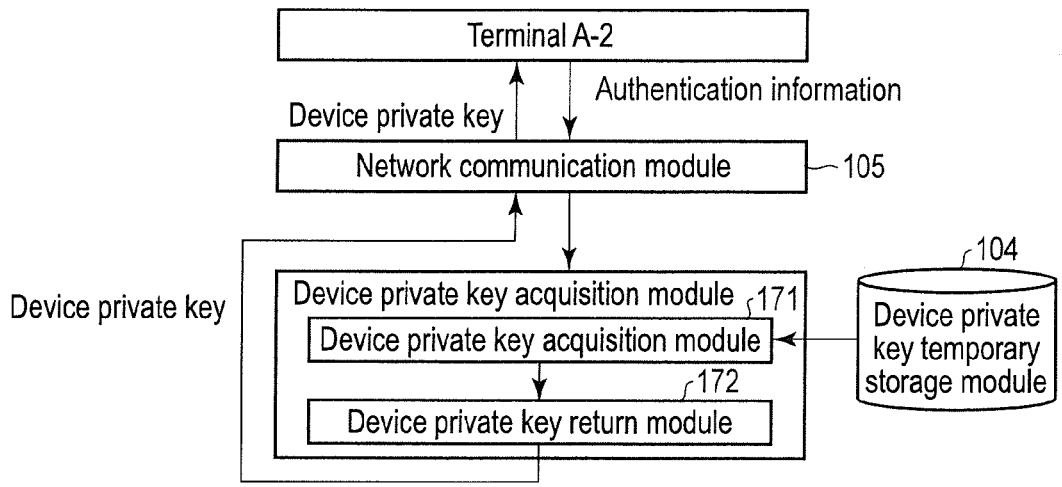
FIG. 31 is an exemplary block diagram used to explain new terminal registration processing.

The processing in steps B41 to B43 will be described with reference to the block diagram of FIG. 31.

The device name input window displays a device number input field and a transmission button. When the user operates the transmission button after inputting a device name to the device name input field, terminal A-2_200B transmits the device name to the key change management apparatus 100, and transmits a request to acquire a device private key to the key change management apparatus 100.

The device private key acquisition module 171 acquires the device private key associated with the device ID of terminal A-2_200B registered in a device private key temporary storage database file in the device private key temporary storage module 104. As shown in FIG. 27, the device private key return module 172 returns the device private key $sk_{DA2}$ to terminal A-2_200B.

Figure 32:
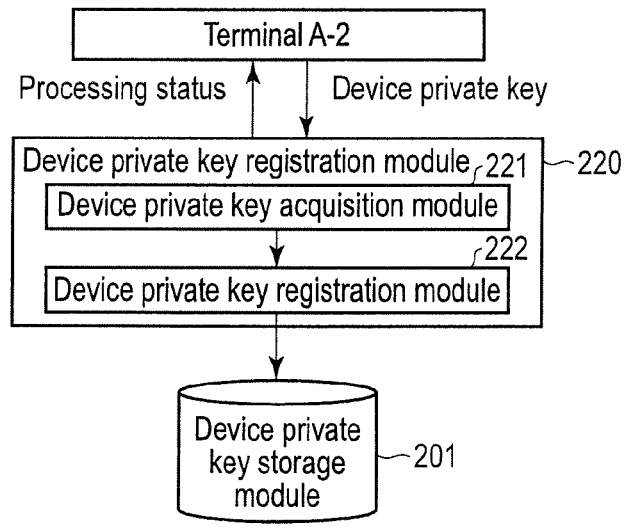
FIG. 32 is an exemplary block diagram used to explain new terminal registration processing.

The processing in step B44 will be described with reference to the block diagram of FIG. 32.

The device private key acquisition module 221 of terminal A-2_200B acquires the returned device private key $sk_{DA2}$. The device private key registration module 222 of terminal A-2_200B registers the device private key $sk_{DA2}$ of terminal A-2_200B in a device private key database file in the device private key storage module 201.

The device private key registration module 220 of terminal A-2_200B notifies the key change management apparatus 100 of the completion of the processing. The device private key acquisition module 170 of the key change management apparatus 100 deletes the device private key of terminal A-2_200B from the device private key temporary storage database file in the device private key temporary storage module 104. Terminal A-2_200B displays a message indicating the completion of the processing on the display screen.

With the above processing, the terminal addition processing is terminated.

(Terminal Invalidation Processing)

A procedure for invalidating a terminal will be described next.

Figures 33, 34:
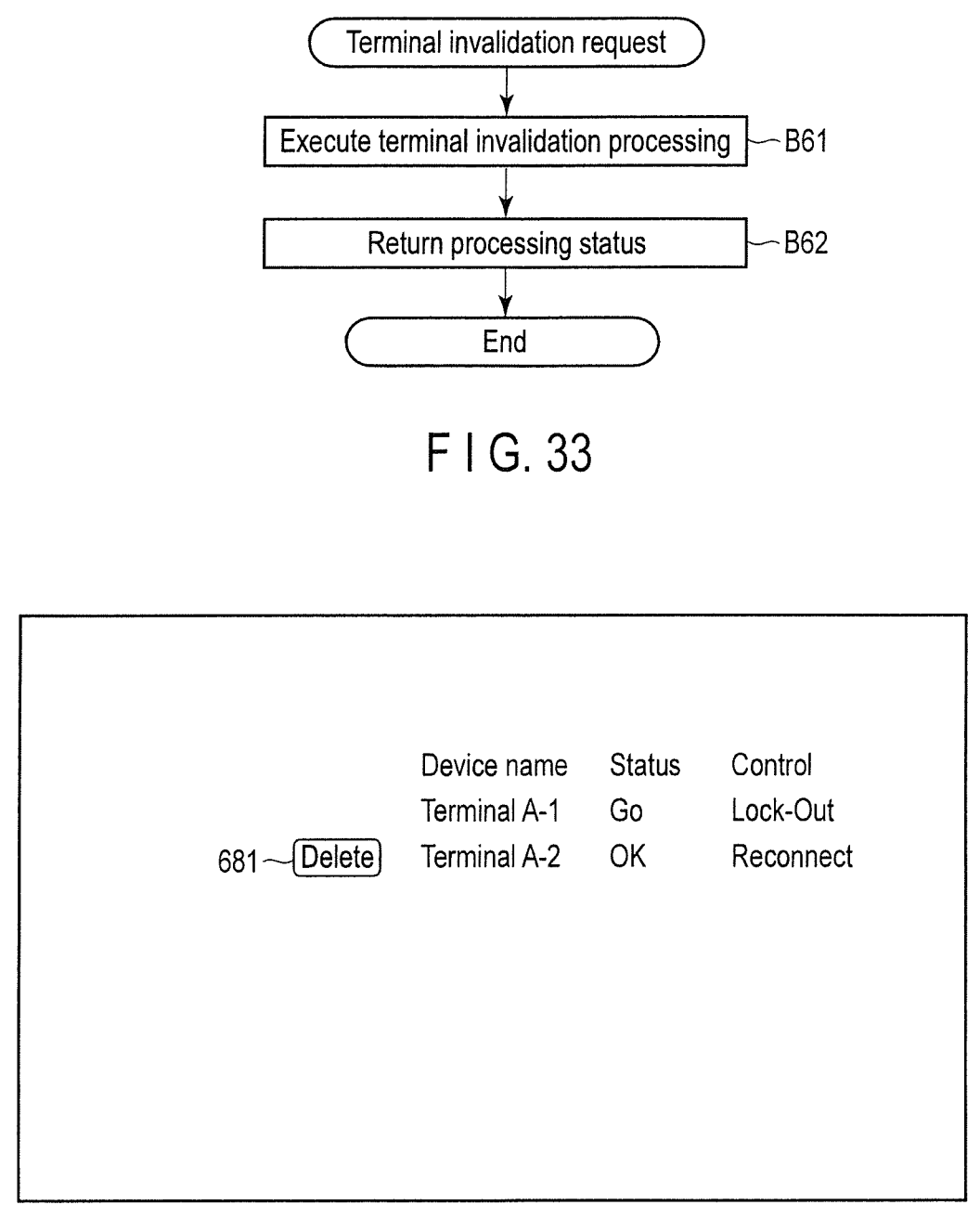

FIG. 33 is a flowchart showing a procedure for terminal invalidation processing. The following is a case in which, for example, the user has lost terminal A-2_200B, and terminal A-1_200A invalidates terminal A-2_200B. FIG. 34 is a view showing a device access management window displayed on the display screen of the management terminal 20 at the time of terminal invalidation processing. FIG. 35 is a block diagram used to explain terminal invalidation processing. Note that terminal invalidation processing is executed between the management terminal 20 and the key change management apparatus 100.

When the user operates a "device access management" button 632 in the device control window shown in FIG. 16, the display screen of the management terminal 20 displays the device access management window shown in FIG. 34. When the user operates a portion corresponding to the device name "terminal A-2_200B", a deletion button 681 is displayed on the left side of the device name "terminal A-2_200B". When the user operates the deletion button 681, the management terminal 20 transmits the authentication information of the management terminal 20 and a request to invalidate terminal A-2_200B as an invalidation request code for terminal A-2_200B to the key change management apparatus 100. The network communication module 105 transmits the invalidation request code to the key change permission/inhibition setting module 120. The key change permission/inhibition information registration module 121 makes the re-encryption key ID corresponding to the device ID and user ID in a key change permission/inhibition database file in the key change permission/inhibition information storage module 101 indicate the inhibition of key change. With the above processing, terminal A-2_200B is invalidated.

(Content Acquisition Processing)

A procedure for the processing of acquiring content from the file sharing system will be described next.

FIG. 36 is a flowchart showing a procedure for content acquisition processing. FIG. 37 is a view showing a content window displayed on the display screen at the time of content acquisition. FIG. 38 is a block diagram used to explain content acquisition processing.

When the user operates a home button 611 in the window shown in FIG. 14, the content window shown in FIG. 37 is displayed. As shown in FIG. 37, when the user operates an icon corresponding to content, the terminal issues a request to acquire the content to the key change management apparatus 100. The key change permission/inhibition information acquisition module 131 acquires a key change permission/inhibition database file from the key change permission/inhibition information storage module 101. The key change permission/inhibition determination module 132 determines whether the key change permission/inhibition associated with the re-encryption key ID corresponding to the device ID and the user ID indicates permission of key change. Upon determining that the key change permission/inhibition does not indicate permission of key change, the key change permission/inhibition determination module 132 notifies the terminal of an error.

Upon determining that the key change permission/inhibition indicates permission of key change, the key change permission/inhibition determination module 132 notifies the re-encryption key acquisition module 141 of permission of key change. The re-encryption key acquisition module 141 acquires a re-encryption key corresponding to the device ID and the user ID from a re-encryption key database file in the re-encryption key storage module 102. The encrypted content acquisition module 142 acquires content encrypted with the user public key from the cloud storage. The re-encryption processing module 143 changes the encryption key for the content to a device public key by using the re-encryption key. The re-encrypted content return module 144 returns the content whose encryption key has been changed to the terminal. The terminal decrypts the content by using the device private key.

If the finder of terminal A-2_200B issues a request for content to the key change management apparatus 100 after the invalidation of terminal A-2_200B, since the system has invalidated key change for terminal A-2_200B, the content is not re-encrypted, and an error is returned to terminal A-2_200B, as shown in FIG. 39. Terminal A-2_200B cannot refer to the content.

(User Private Key Request Processing)

A procedure for processing in a case in which a terminal issues a request for a user private key to the key change management apparatus 100 will be described. FIG. 40 is a flowchart showing a procedure for processing to be performed when a user private key is required.

The key change permission/inhibition determination module 132 determines whether key change permission/inhibition associated with a re-encryption key ID corresponding to a device ID and a user ID indicates the permission of key change. Upon determining that the key change permission/inhibition indicates inhibition of key change, the key change permission/inhibition determination module 132 notifies the terminal of an error.

Upon determining that the key change permission/inhibition indicates permission of key change, the key change permission/inhibition determination module 132 notifies the terminal of permission of key change. The re-encryption key acquisition module 141 acquires a re-encryption key corresponding to the device ID and the user ID from a re-encryption key database file in the re-encryption key storage module 102. The encrypted content acquisition module 142 acquires a user private key encrypted with the user public key from the user private key storage module 103. The re-encryption processing module 143 changes the encryption key of the user private key to the device public key by using the re-encryption key. The re-encrypted content return module 144 returns the user private key whose encryption key has been changed to the terminal. The terminal decrypts the user private key by using the device private key.

Figure 41:
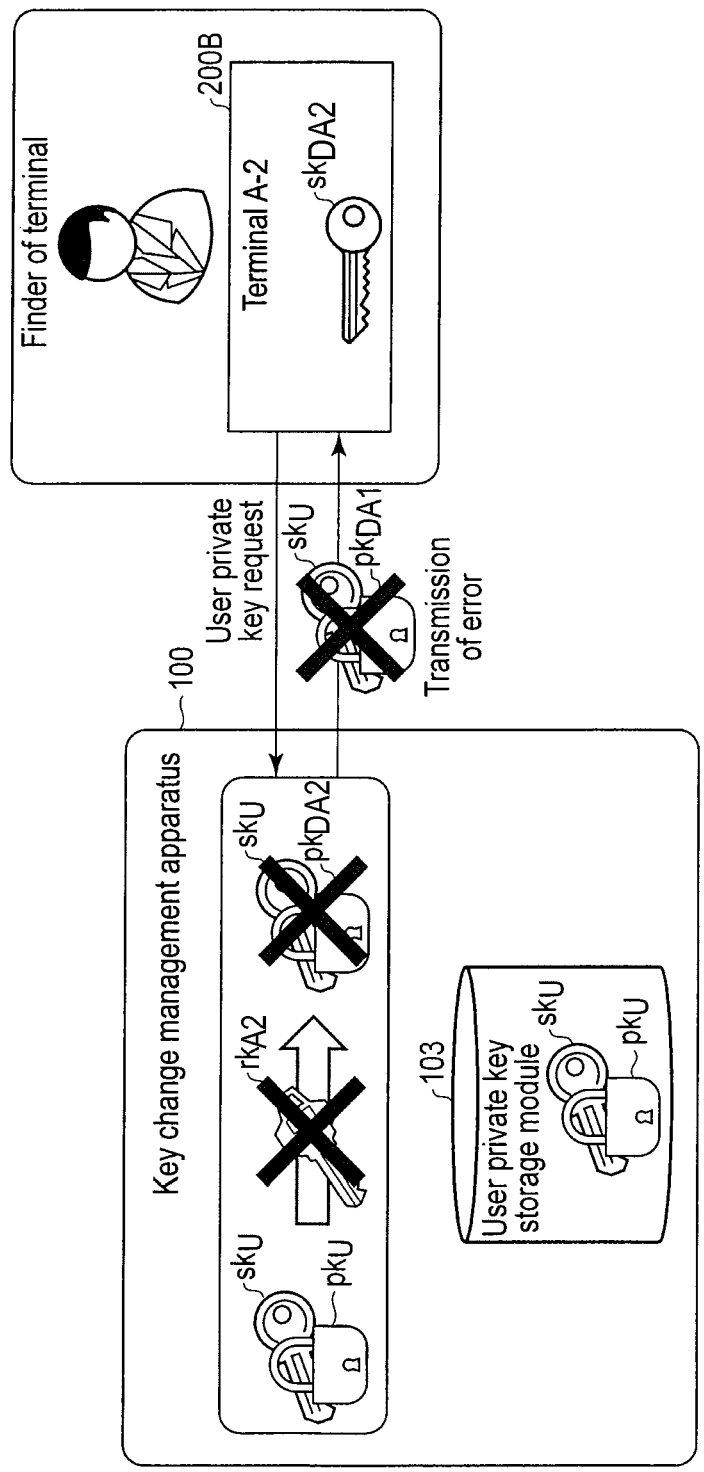
FIG. 41 is an exemplary view schematically showing a case in which terminal A-2 has issued a request to acquire a user private key.

If the finder of terminal A-2_200B issues a terminal addition request after invalidation of terminal A-2_200B, the user private key $sk_U$ is not re-encrypted, and an error is returned to terminal A-2_200B, as shown in FIG. 41. Terminal A-2_200B cannot acquire the user private key $sk_U$. Therefore, it is not possible to add any terminal from terminal A-2_200B.

As described above, the key change management apparatus includes a first storage, a changer, a second storage, a third storage, a storage controller, and a first transmitter. The first storage is configured to store first information indicating whether it is permitted to change an encryption key for encrypting a private key of a user from a public key of the user to a public key of a first device by using a first re-encryption key in accordance with a request from the first device, the first re-encryption key being generated by the first device based on a private key of the user and a public key of the first device. The changer is configured to change the encryption key for encrypting the private key of the user from the public key of the user to the public key of the first device by using the first re-encryption key in accordance with the request from the first device when the first information indicates that it is permitted to change the encryption key for encrypting the private key from the public key of the user to the public key of the first device. The second storage is configured to store a private key of a second device transmitted from the first device wherein the first device generates the private key of the second device and a public key of the second device. The third storage is configured to store the first re-encryption key and a second re-encryption key, wherein the second re-encryption key is generated by the first device based on the private key of the user and the public key of the second device. The storage controller is configured to store, in the first storage, second information indicating whether it is permitted to change the encryption key for encrypting the private key of the user from the public key of the user to a public key of a second device by using the second re-encryption key in accordance with a request from the second device. The first transmitter is configured to transmit the private key of the second device in the second storage to the second device in accordance with a request from the second device. Thus, it is possible to register or add a new terminal (the second terminal) from an arbitrary terminal (the first terminal) which has already been registered.

According to this embodiment, a user private key for issuing a re-encryption key is encrypted with a user public key and held on the server side. Since a user private key required for decryption does not exist in any terminal, it is not possible to acquire a key unless the key change management apparatus performs re-encryption.

According to the embodiments, the user can validate/invalidate his/her own terminal on a "terminal" basis. This makes it possible to implement flexible terminal management, for example, inhibiting a lost terminal from only accessing the key change management apparatus 100 while permitting the use of other terminals. Inhibiting the use of a re-encryption key can invalidate the acquisition of a user private key from a lost terminal. Since no valid user private key is left on a terminal, it is not possible to perform terminal addition. This improve the security.

The new terminal addition processing, terminal invalidation processing, content acquisition processing, and user private key request processing, and the like in the embodiments can be implemented by computer programs. It is therefore possible to easily achieve the same effects as those of the embodiments by only installing the computer programs in a general computer via a computer-readable storage medium storing the computer programs and executing them.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key change management apparatus comprising:
a first storage configured to store a first information indicating whether a changer is permitted to change an encryption key for encrypting a private key of a user from a public key of the user to a public key of a first device by using a first re-encryption key in accordance with a request from the first device, wherein the first device generates the first re-encryption key based on a private key of the user and a public key of the first device and transmits the first re-encryption key to the key change management apparatus;
the changer configured to change the encryption key for encrypting the private key of the user from the public key of the user to the public key of the first device by using the first re-encryption key in accordance with the request from the first device when the first information indicates that the changer is permitted to change the encryption key for encrypting the private key from the public key of the user to the public key of the first device;
a second storage configured to store a private key of a second device, wherein the first device generates the private key of the second device and a public key of the second device and transmits the private key of the second device to the key change management apparatus;
a third storage configured to store the first re-encryption key and a second re-encryption key, wherein the first device generates the second re-encryption key based on the private key of the user and the public key of the second device and transmits the second re-encryption key to the key change management apparatus;
a storage controller configured to store, in the first storage, second information indicating whether the changer is permitted to change the encryption key for encrypting the private key of the user from the public key of the user to the public key of a second device by using the second re-encryption key in accordance with a request from the second device; and
a first transmitter configured to transmit the private key of the second device in the second storage to the second device in accordance with a request from the second device.

2. The apparatus of claim 1, further comprising a deletion module configured to delete the private key of the second device in the second storage.

3. The apparatus of claim 2, further comprising:
a first determination module configured to determine, based on the first information or second information, whether the changer is permitted to change the encryption key of the private key of the user, when the first device or the second device issues a request to transmit content that is encrypted by the encryption key; and
a second transmission module configured to transmit, to the first device or the second device, the content whose encryption key is changed by the change module to the public key of the first device or the public key of the second device by using the first re-encryption key or the second re-encryption key, when the first information or the second information indicates that the changer is permitted to change the encryption key.

4. The apparatus of claim 2, further comprising:
a second determination module configured to determine, based on the first information or the second information, whether the changer is permitted to change the encryption key of the private key of the user;
a third transmission module configured to transmit, to the first device or and the second device, the private key of the user whose encryption key is changed by the change module to the public key of the first device or the public key of the second device by using the first re-encryption key or the second re-encryption key, when the first information or the second information indicates that the changer is permitted to change the encryption key.

5. The apparatus of claim 1, further comprising a second changer configured to change the first information or the second information in accordance with a request from a management terminal.

6. A key change management method comprising:
storing, in a first storage, first information indicating whether a changer is permitted to change an encryption key for encrypting a private key of a user from a public key of the user to a public key of a first device by using a first re-encryption key;
changing the encryption key for encrypting the first private key of the user from a public key of the user to the public key of the first device by using the first re-encryption key, in accordance with a request from the first device when the first information indicates that the changer is permitted to change the encryption key for encrypting the private key, wherein the first device generates the first re-encryption key based on a private key of the user and a public key of the first device and transmits the first re-encryption key to the key change management apparatus;
storing, in a second storage, a private key of a second device, wherein the first device generates the private key of the second device and a public key of the second device and transmits the private key of the second device to the key change management apparatus;
storing, in a third storage, a second re-encryption key, wherein the first device generates the second re-encryption key based on the private key of the user and the public key of the second device;
transmitting the second re-encryption key to the key change management apparatus;
storing, in the first storage, second information indicating whether the changer is permitted to change the encryption key for encrypting the private key of the user from the public key of the user to the public key of the second device by using the second re-encryption key in accordance with a request from the second device; and transmitting the private key of the second device stored in the second storage to the second device in accordance with a request from the second device.

7. The method of claim 6, further comprising deleting the private key of the second device stored in the second storage.

8. The method of claim 7, further comprising:

determining, based on the first information or second information, whether it is permitted to change an encryption key, when one of the first terminal and the second terminal issues a request to transmit content; and transmitting, to one of the first device or the second device, the content whose encryption key is changed to one of the public key of the first device or the public key of the second device by using one of the first re-encryption key or the second re-encryption key, when the first information or the second information indicates that the changer is permitted to change the encryption key.

9. The method of claim 7, further comprising:

determining, based on the first information or second information, whether the changer is permitted to change the encryption key of the private key of the user, when one of the first device or the second device issues a request to transmit the private key of the user; and transmitting, to one of the first device or the second device, the private key of the user whose encryption key is changed to one of the public key of the first device or the public key of the second device by using one of the first re-encryption key or the second re-encryption key, when the first information or the second information indicates that the changer is permitted to change the encryption key.

10. The method of claim 6, further comprising:

changing the first information in accordance with a request from a management device; and changing the second information in accordance with a request from the management device.

11. A computer-readable, non-transitory storage medium configured to store a computer program which is executable by a computer, the computer program controlling the computer to execute functions of:

storing, in a first storage, first information indicating whether a changer is permitted to change an encryption key for encrypting a private key of a user from a public key of the user to a public key of a first device by using a first re-encryption key;

changing an encryption key for encrypting the first private key of the user from the public key of the user to the public key of the first device by using the first re-encryption key, in accordance with a request from the first device, wherein the first device generates the first re-encryption key based on a private key of the user and a public key of the first device and transmits the first re-encryption key to the key change management apparatus;

storing, in a second storage, a private key of a second device, wherein the first device generates the private key of the second device and a public key of the second device and transmits the private key of the second device to the key change management apparatus;

storing, in a third storage, a second re-encryption key, wherein the first device generates the second re-encryption key based on the private key of the user and the public key of the second device;

transmitting the second re-encryption key to the key change management apparatus;

storing, in the first storage, second information indicating whether the changer is permitted to change the encryption key for encrypting the private key of the user from the public key of the user to the public key of a second device by using the second re-encryption key in accordance with a request from the second device; and transmitting the private key of the second device stored in the second storage to the second device in accordance with a request from the second device.

12. The medium of claim 11, wherein the computer program further controls the computer to execute functions of deleting the private key of the second device stored in the second storage.

13. The medium of claim 12, wherein the computer program further controls the computer to execute functions of:

determining, based on the first information or second information, whether it is permitted to change an encryption key, when one of the first terminal and the second terminal issues a request to transmit content; and transmitting, to one of the first device or the second device, the content whose encryption key is changed to one of the public key of the first device or the public key of the second device by using one of the first re-encryption key or the second re-encryption key, when the first information or the second information indicates that the changer is permitted to change the encryption key.

14. The medium of claim 12, wherein the computer program further controls the computer to execute functions of:

determining, based on the first information or second information, whether the changer is permitted to change the encryption key of the private key of the user, when one of the first device or the second device issues a request to transmit the private key of the user; and transmitting, to one of the first device or the second device, the private key of the user whose encryption key is changed to one of the public key of the first device or the public key of the second device by using one of the first re-encryption key or the second re-encryption key, when the first information or the second information indicates that the changer is permitted to change the encryption key.

15. The medium of claim 11, wherein the computer program further controls the computer to execute functions of:

changing the first information in accordance with request from a management device; and changing the second information in accordance with a request from the management device.

* * * * *